(12) United States Patent
Chan et al.

(10) Patent No.: US 9,661,357 B2
(45) Date of Patent: May 23, 2017

(54) METHOD AND SYSTEM TO LOCALLY CACHE AND INFORM USERS OF PARTIAL VIDEO SEGMENTS AND DATA OBJECTS

(75) Inventors: Douglas Chan, San Jose, CA (US); Jay Iyer, San Jose, CA (US); Wei-Jen Hsu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1047 days.

(21) Appl. No.: 13/417,377

(22) Filed: Mar. 12, 2012

(65) Prior Publication Data

US 2013/0239158 A1  Sep. 12, 2013

(51) Int. Cl.

| | | |
|---|---|---|
| *H04N 7/173* | (2011.01) | |
| *H04N 21/222* | (2011.01) | |
| *H04N 21/231* | (2011.01) | |
| *H04N 21/433* | (2011.01) | |
| *H04N 21/44* | (2011.01) | |
| *H04N 21/472* | (2011.01) | |
| *H04N 21/845* | (2011.01) | |

(52) U.S. Cl.
CPC ..... *H04N 21/2223* (2013.01); *H04N 7/17318* (2013.01); *H04N 21/23106* (2013.01); *H04N 21/4331* (2013.01); *H04N 21/44004* (2013.01); *H04N 21/47217* (2013.01); *H04N 21/8456* (2013.01)

(58) Field of Classification Search
CPC ........... H04N 21/4126; H04N 21/2225; H04N 21/43615; H04N 21/4334; H04N 21/47217; H04N 21/47202; H04N 21/222; H04N 21/221; H04N 21/23106; H04N 21/21815; H04N 21/2183; H04N 7/17318; H04N 21/4331; H04N 21/44004; G06F 3/0484; G06F 3/04842
See application file for complete search history.

(56) References Cited

U.S. PATENT DOCUMENTS

| | | | |
|---|---|---|---|
| 6,813,690 B1* | 11/2004 | Lango et al. | 711/118 |
| 8,413,064 B2* | 4/2013 | Bauer | G06F 3/048 715/736 |
| 2002/0174430 A1* | 11/2002 | Ellis et al. | 725/46 |
| 2005/0005308 A1* | 1/2005 | Logan | G06Q 30/06 725/135 |
| 2005/0193414 A1* | 9/2005 | Horvitz et al. | 725/46 |
| 2006/0020971 A1* | 1/2006 | Poslinski | H04N 5/44543 725/44 |
| 2006/0080716 A1* | 4/2006 | Nishikawa | G06F 17/30849 725/89 |
| 2008/0072145 A1* | 3/2008 | Blanchard | G06F 17/22 715/273 |
| 2008/0168516 A1* | 7/2008 | Flick | H04N 21/23106 725/112 |
| 2008/0168523 A1* | 7/2008 | Ansari et al. | 725/131 |
| 2008/0250358 A1* | 10/2008 | Mitchem | G11B 27/322 715/855 |

(Continued)

*Primary Examiner* — Ricky Chin
(74) *Attorney, Agent, or Firm* — Merchant & Gould P.C.

(57) ABSTRACT

A user device may send a request for a data file to an access point. The user device may then receive, from the access point, data indicating that a segment of the data file has been previously cached in a local cache at the access point. In response to receiving the data, the user device may display an indicator configured to indicate that the segment of the data file is cached in the local cache.

26 Claims, 4 Drawing Sheets

(56) References Cited

U.S. PATENT DOCUMENTS

| | | | |
|---|---|---|---|
| 2011/0185269 A1* | 7/2011 | Finkelstein | G11B 27/28 |
| | | | 715/202 |
| 2012/0004958 A1* | 1/2012 | Bloom | G06Q 30/0241 |
| | | | 705/14.4 |
| 2012/0131613 A1* | 5/2012 | Ellis | H04N 5/44543 |
| | | | 725/39 |
| 2012/0167125 A1* | 6/2012 | Grubb | H04N 21/252 |
| | | | 725/14 |
| 2012/0191804 A1* | 7/2012 | Wright et al. | 709/217 |
| 2013/0031211 A1* | 1/2013 | Johnson | H04N 21/23103 |
| | | | 709/218 |
| 2013/0268620 A1* | 10/2013 | Osminer | H04N 21/251 |
| | | | 709/217 |
| 2014/0082666 A1* | 3/2014 | Bloch | G11B 27/34 |
| | | | 725/37 |

\* cited by examiner

METHOD AND SYSTEM TO LOCALLY CACHE AND INFORM USERS OF PARTIAL VIDEO SEGMENTS AND DATA OBJECTS

BACKGROUND

Content delivery describes the delivery of media content such as audio, video, computer software, and video games over a delivery medium such as broadcasting or the Internet. Specialist networks, known as content delivery networks, distribute digital content on the Internet. Alternative technologies for content delivery include peer-to-peer file sharing technologies. Content can only be delivered if it exists. If it does not exist, several techniques and methods can be used for content creation or content regeneration. Alternatively, content delivery platforms create and syndicate content remotely, acting like hosted content management systems.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
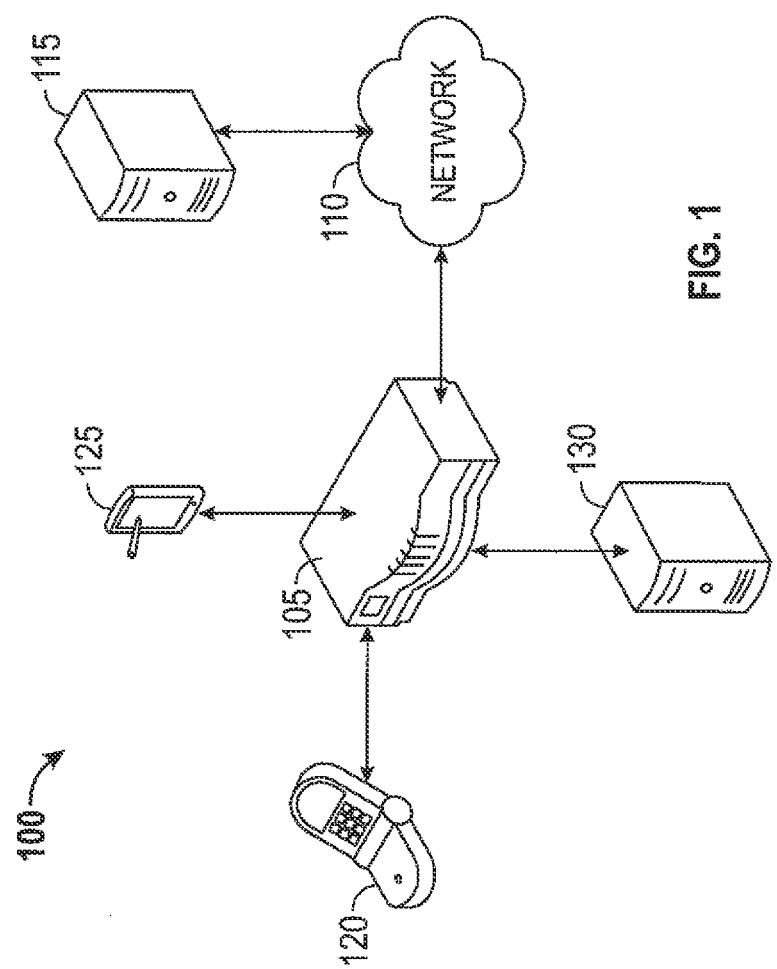
FIG. 1 shows an operating environment.

A user device may send a request for a data file to an access point. The user device may then receive, from the access point, data indicating that a segment of the data file has been previously cached in a local cache at the access point. In response to receiving the data, the user device may display an indicator configured to indicate that the segment of the data file is cached in the local cache.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

FIG. 1 is a block diagram of an operating environment 100. As shown in FIG. 1, operating environment 100 may include an access point 105, a network 110, and a content server 115. Access point 105 may obtain content from content server 115 over network 110 and provide a first user device 120, a second user device 125, and a third user device 130 with the obtained content. Access point 105 may also include a local cache.

The obtained content may comprise a data file that may comprise video and/or audio data such as web data object requests. Notwithstanding, the content may comprise any type of data. Network 110 may comprise any type of network (e.g. the Internet, a content delivery network (CDN), etc.) capable of delivering content from content server 115 to access point 105. First user device 120, second user device 125, and third user device 130 may comprise any type of devices capable of requesting and receiving the obtained content from access point 105. For example, first user device 120 may comprise a smart phone, second user device 125 may comprise a tablet computer, and third user device 130 may comprise any type of computing device. Access point 105 may comprise, but is not limited to, a Wi-Fi access point, a cellular base station, a switch servicing multiple clients in a vicinity, a tablet device, a mobile device, a smart phone, a telephone, a remote control device, a set-top box, a digital video recorder, a cable modem, a personal computer, a network computer, a mainframe, a router, or other similar microcomputer-based device.

Consistent with embodiments of the disclosure, whenever an online video (e.g. a data file) is requested by a user (e.g. using first user device 120), network 110 may deliver objects corresponding to the video data across network 110. If the user is a wireless client, its associated access point (e.g. Wi-Fi access point (AP), mobile cellular base station (BS), etc.) may be the first node (e.g. access point 105) in the network to relay the video request.

There may be a high likelihood for users in the same vicinity to request an identical video around the same time. Since users in the same vicinity may be associated to the same AP, the AP may have to request the identical video stream many times. But fielding requests of the same video from different users may create inefficiency. This is because each repeated video request may represent repeated transporting of the same video content across network 110. This may create poor usage of bandwidth on network 110 and may add unnecessary latency for users. This may also incur avoidable video transcoding costs at content server 115. Consistent with embodiments of the disclosure, access point 105 may cache requested video content and deliver it to users when the same is subsequently requested, thus minimizing the aforementioned inefficiencies.

Embodiments of the disclosure may exploit a user behavior known as "video snacking". In video snacking, users often request a video without the intention of actually watching its entirety, but only to sample portions of the video at various spots. For example, the user may watch the video's beginning few seconds and then start clicking on various segments in the middle of the video and watch several seconds, before perhaps skipping to view the end. (Thus, the user is "snacking" on the video.) As a result, during video-snacking, the user ends up requesting small ("bite-size") portions at time-spots spread across the video. The user gets to sample the video before deciding whether it's worth waiting for a full video download; however, the same network and video transcoding costs are still there each time the user requests a segment. Consequently, there can still be a decent amount of waiting time for each segment request.

To address the aforementioned issues, embodiments of the disclosure may cache partial video segments at an access point and for an application to inform the user of the locations of the cached partial video segments in the video.

The cached segments may be delivered expeditiously to the user. Since a previous video-snacking user is probably clicking on arbitrary spots spread throughout the video, these spots may be able to serve another video-snacking user's purpose. If not, the user can always click on an un-cached segment. And in the long run, a good number of short segments of a popularly requested video would have been cached, eventually accumulating enough to combine into the full video too. In summary, embodiments of the disclosure can effectively improve network efficiency and user experience.

Figure 2:
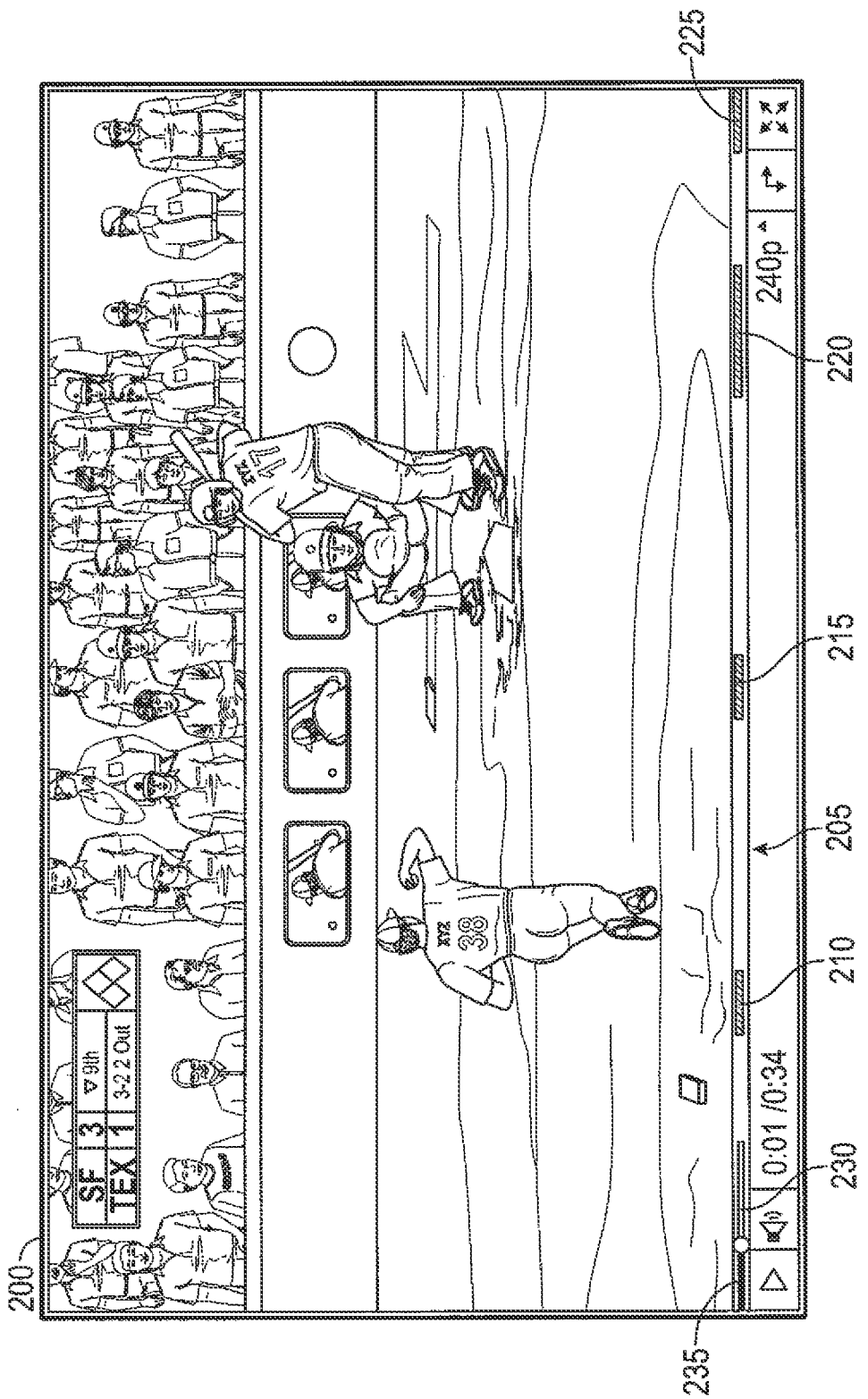
FIG. 2 shows a screen shot.

FIG. 2 shows a screen shot 200 consistent with embodiments of the disclosure. Screen 200 may be displayed by an application running on any of first user device 120, second user device 125, or third user device 130. As shown in FIG. 2, the user may have requested a video that had been requested by previous user(s) on access point 105 who only viewed small segments of the video before closing it. As a result, although the entire video may not be cached at access point 105, however some of its small video segments, viewed by previous users, may be.

When the video is first requested at access point 105, an application (running on first user device 120, for example) and access point 105 may communicate to determine the video segment(s) that are cached at access point 105. The application may be informed by access point 105 of the time locations and durations of these cached segments.

As shown in FIG. 2, the application may display an indicator configured to indicate that at least one segment of the data file corresponding to the video has been cached in a local cache at access point 105. This indicator may comprise, but not limited to, a colored section along a time bar 205, which may be a different color. For example, a first cached indicator 210, a second cached indicator 215, a third cached indicator 220, and a fourth cached indicator 225 may comprise indictors and correspond to segments of the video that are presently cached in the local cache on access point 105. First cached indicator 210, second cached indicator 215, third cached indicator 220, and fourth cached indicator 225 may comprise, for example, yellow sections within a gray time bar 205. The aforementioned colors are examples and any color or visual indicator may be used.

A download indicator 230 (e.g. a light red color) in time bar 205 may represent a portion of the video that is already downloaded onto a local client (e.g. first user device 120) but not yet played back. A played indicator 235 (e.g. a dark red color) of time bar 205 may indicate portions that the local client (e.g. first user device 120) has already played. (The aforementioned colors are examples and any color or visual indicator may be used.) Data (e.g. video segment data) corresponding to first cached indicator 210, second cached indicator 215, third cached indicator 220, and fourth cached indicator 225 may be immediately sent to the local client (e.g. first user device 120) from access point 105 when the video is first requested without requiring this data be fetched across network 110 from content provider 115.

Since the application (e.g. on first user device 120) may start playing from the beginning of the video, when that occurs screen 200 may indicate that the first few seconds of the video has been played, as the rest is being delivered to first user device 120. At this point, after viewing these initial seconds, perhaps the user may wish to sample the rest of the video. The user can then consider clicking on the yellow segments (e.g. first cached indicator 210, second cached indicator 215, third cached indicator 220, or fourth cached indicator 225) and expect access point 105 to retrieve them from the local cache without incurring the wait time associated with requesting them over network 110.

A new user to the interface of FIG. 2 may not know initially what the colored segments (e.g. yellow segments) stand for. As such, the interface (e.g. screen 200) can also display text strings similar to, for example, "Locally Cached at AP" when the user's mouse hovers on, for example, first cached indicator 210, second cached indicator 215, third cached indicator 220, or fourth cached indicator 225.

Consistent with embodiments of the disclosure, when a video request is received from the application (e.g. running on first user device 120), in addition to the aforementioned communication with the application running on first user device 120 about the cached segments, access point 105 may also do the following. First, access point 105 may begin requesting un-cached segments of the requested video from content provider 115 over network 110 and may transmit these un-cached segments to first user device 120 as they arrive at access point 105. In addition, access point 105 may cache these segments in its local storage (e.g. the local cache) and may maintain a record of starting times and durations of video segments received from content provider 115 over network 110. Access point 105 may omit loading into the local cache any previously cached segments of the same video. A cached video segment can be deleted (or aged out) to free storage space in the local cache when the segment or the video has not been requested after a certain time (e.g. 24 hours.)

Consistent with embodiments of the disclosure, since the application starts from the beginning of the video, the initial segments of any previously requested videos are typically cached already. Consequently, instead of loading from network 110 a video from the top, access point 105 may immediately start loading from the end of the earliest cached segment. This process may also be applied when the user requests a previously cached segment.

Consistent with embodiments of the disclosure, automated algorithms may identify the most important segments of a video (the level of importance determined via some given criteria). For example, a segment that summarizes the entire video's content. These special video segments can be pushed out to access point 105 and pre-populated in the local cache at access point 105. As a result, when such a video is being requested, the user can click on cached sections in time bar 205 (as described above) of the video that represents its most critical parts and receive them quickly. Similarly, a video producer may determine what to mark in a video as special segments.

Consistent with embodiments of the disclosure, locally caching partial and discontinuous data objects or video segments from past user requests may be provided. A user may be informed of these locally cached partial objects or video segments, and their relative locations within the overall object or video. Consequently: i) more expeditious delivery of segments of a video or data objects requests: ii) shorter waiting time and better user experience; and iii) less redundant data traffic and more efficient use of networking resource may be provided. If video is transcoded on demand at the server, then embodiments of the disclosure may also eliminate unnecessary repeated transcoding of the same video, hence freeing a server's computation load.

Figure 3:
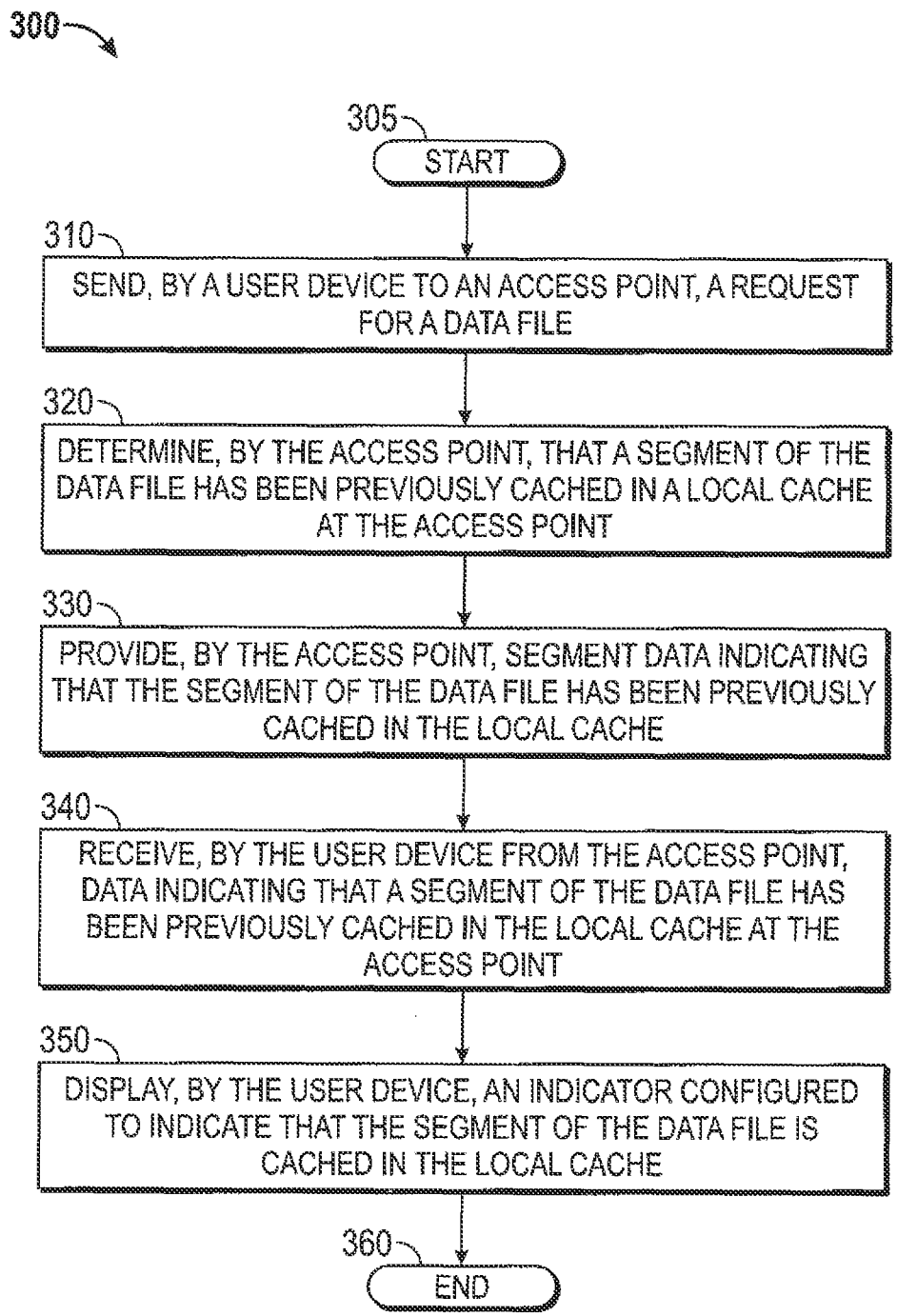
FIG. 3 is a flow chart of a method for locally caching partial video segments.

FIG. 3 is a flow chart setting forth the general stages involved in a method 300 consistent with an embodiment of the disclosure for locally caching partial video segments. Method 300 may be implemented using a computing device 400 as described in more detail below with respect to FIG.

4. Ways to implement the stages of method 300 will be described in greater detail below.

Method 300 may begin at starting block 305 and proceed to stage 310 where first user device 120 may send a request for a data file to access point 105. For example, the user may wish to view a video. The user may use a web browser application (e.g. the application) running on first user device 120 to send the request for the video data to access point 105.

From stage 310, where first user device 120 sends the request for the data file to access point 105, method 300 may advance to stage 320 where access point 105 may determine that a segment of the data file has been previously cached in a local cache at access point 105. For example, another user may have previously requested the video corresponding to the data file through access point 105. Rather than viewing the whole video, the previous user may have "snacked" on the video only viewing certain segments before closing out the video. In response, access point 105 may have saved these certain previously viewed snacked on segments for a predetermined amount of time in a local cache on access point 105. When the present user requests this video within the predetermined time, access point 105 may determine that the local cache has a segment or segments of the video saved locally in its local cache. Furthermore, as described above, the segment of the data file may have been previously cached in the local cache at access point 105 in response to a producer of the video or an automatic algorithm determining that the segments is the most important part of the video.

Once access point 105 determines that the segment of the data file has been previously cached in the local cache at access point 105 in stage 320, method 300 may continue to stage 330 where access point 105 may provide first user device 120 segment data indicating that the segment of the data file has been previously cached in the local cache. For example, since access point 105 may have determined that the segment is locally cached, access point 105 may send first user device 120 this locally cached segment and then get the rest of the video from content server 115 over network 110. Since it already has the segment, access point 105 may not bother with getting the segment from content server 115 over network 110.

After access point 105 provides first user device 120 segment data indicating that the segment of the data file has been previously cached in the local cache in stage 330, method 300 may proceed to stage 340 where first user device 120 may receive the data indicating that the segment of the data file has been previously cached in the local cache at access point 105.

From stage 340, where first user device 120 receives the data indicating that the segment of the data file has been previously cached in the local cache at access point 105, method 300 may advance to stage 350 where first user device 120 may display an indicator configured to indicate that the segment of the data file is cached in the local cache. For example, the indicator may comprise, but is not limited to, first cached indicator 210, second cached indicator 215, third cached indicator 220, or fourth cached indicator 225 as described about with respect to FIG. 2 above. First user device may receive a selection of the indicator and play, in response to the received selection, the segment of the data file. Once first user device 120 displays an indicator configured to indicate that the segment of the data file is cached in the local cache in stage 350, method 300 may then end at stage 360.

Figure 4:
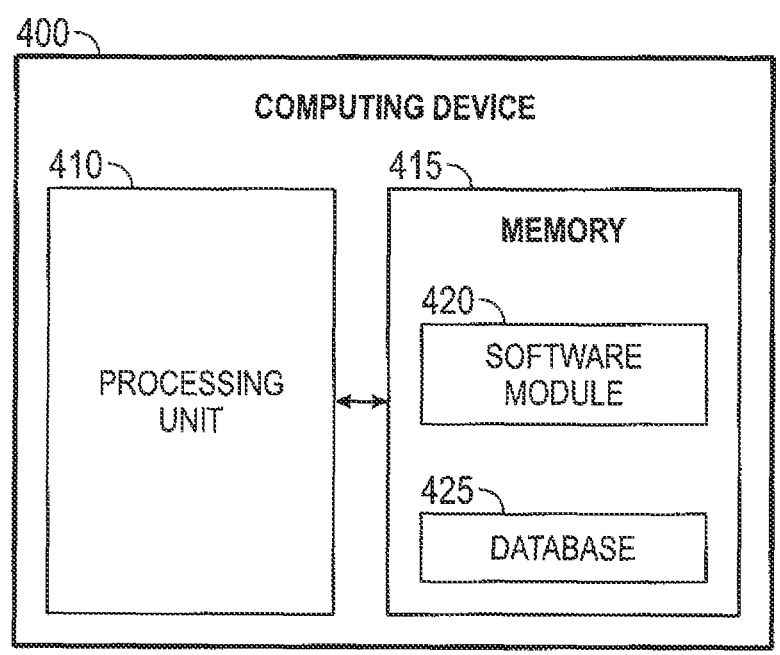
FIG. 4 shows a computing device.

FIG. 4 shows computing device 400 in more detail. As shown in FIG. 4, computing device 400 may include a processing unit 410 and a memory unit 415. Memory unit 415 may include a software module 420 and a database 425. While executing on processing unit 410, software module 420 may perform processes for locally caching partial video segments, including for example, any one or more of the stages from method 300 described above with respect to FIG. 3. Computing device 400, for example, may provide an operating environment for access point 105, first user device 120, second user device 125, or a third user device 130. Access point 105, first user device 120, second user device 125, or a third user device 130 may operate in other environments and are not limited to computing device 400.

Computing device 400 ("the processor") may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and the processor may comprise other systems or devices.

An embodiment consistent with the disclosure may comprise a system for locally caching partial video segments. The system may comprise a memory storage and a processing unit coupled to the memory storage. The processing unit may be operative to send a request for a data file and receive data indicating that a segment of the data file has been previously cached in a local cache. In addition, the processing unit may be operative to display an indicator configured to indicate that the segment of the data file is cached in the local cache.

Another embodiment consistent with the disclosure may comprise a system for locally caching partial video segments. The system may comprise a memory storage and a processing unit coupled to the memory storage. The processing unit may be operative to receive a request for a data file and determine that a segment of the data file has been previously cached in a local cache in the memory storage. In addition, the processing unit may be operative to provide segment data indicating that the segment of the data file has been previously cached in the local cache.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    sending, by a user device to an access point, a request for a data file;
    receiving, by the user device from the access point, data indicating that a plurality of segments of the data file has been previously cached in a local cache at the access point, the plurality of segments corresponding to discontinuous portions at time spots spread across the data file;
    receiving a time spot and a duration for each of the plurality of segments;
    displaying, by the user device, at least two indicators along a time bar to indicate the time spot and the duration for each of the plurality of segments of the data file cached in the local cache, wherein displaying the at least two indicators comprises displaying a first indicator to indicate a first time spot and a first duration for a first segment of the data file cached in response to a first user snacking the data file and displaying a second indicator to indicate a second time spot and a second duration for a second segment of the data file cached in response to a second user snacking the data file, wherein displaying the at least two indicators further comprises displaying a third indicator to indicate a third time spot and a third duration for a third segment of the data file caches in response to a video producer identifying a special segment in the data file, and wherein the first segment, the second segment, and the third segment are discontinuous segments of the data file; and
    displaying, by the user device in response to a mouse hover over one of the at least two indicators, a text string indicating that each of the plurality of segments of the data file are cached in the local cache.

2. The method of claim 1, further comprising determining, by the access point, that the plurality of segments of the data file has been previously cached in the local cache.

3. The method of claim 1, further comprising providing, by the access point to the user device, data indicating that the plurality of segments of the data file has been previously cached in the local cache.

4. The method of claim 1, wherein sending the request for the data file comprises sending the request for the data file comprising video data.

5. The method of claim 1, wherein displaying the indicator further comprises displaying the indicator to indicate a location in the data file corresponding to each of the plurality of segments.

6. The method of claim 1, further comprising caching the plurality of segments of the data file in the local cache in response to the first user requesting the data file.

7. The method of claim 1, further comprising caching the plurality of segments of the data file in the local cache in response to a content provider indicating the segment.

8. The method of claim 1, further comprising caching the plurality of segments of the data file in the local cache in response to a content provider indicating that the segment is the most important segment in the data file.

9. The method of claim 1, wherein displaying the at least two indicators further comprises the first indicator to indicate the time spot and the duration for the first segment of the data file cached in response to video snacking of the data file by a first user and displaying the second indicator to indicate the time spot and the duration for the second segment of the data file cached in response to video snacking of the data file by a second user.

10. An apparatus comprising:
    a memory storage storing instructions; and
    a processing unit coupled to the memory storage, wherein the stored instructions when executed, cause the processing unit to:
    receive a request for a data file;
    determine that a plurality of segments of the data file have been previously cached in a local cache in the memory storage, the plurality of segments corresponding to discontinuous portions at time spots spread across the data file;

provide segment data indicating that the plurality of segments of the data file has been previously cached in the local cache; and provide at least two time spot and duration for the plurality of segments of the data file, wherein the processing unit being configured to provide at least two time spot and duration comprises the processing unit configured to:

provide a first time spot and a first duration for a first segment of the data file cached in response to a first user snacking the data file, provide a second time spot and a second duration for a second segment of the data file cached in response to a second user snacking the data file, and provide a third indicator to indicate a third time spot and a third duration for a third segment of the data file caches in response to a video producer identifying a special segment in the data file, wherein the first segment, the second segment, and the third segment are discontinuous segments of the data file.

11. The apparatus of claim 10, wherein the data file comprises video data.

12. The apparatus of claim 10, wherein the time spot comprises a start time of a segment in the data file.

13. The apparatus of claim 10, wherein, when executed the stored instructions further cause the processing unit to cache the plurality of segments of the data file in the local cache in response to the first user requesting the data file.

14. The apparatus of claim 10, wherein, when executed the stored instructions further cause the processing unit to cache the plurality of segments of the data file in the local cache in response to a content provider indicating the segment.

15. The apparatus of claim 10, wherein, when executed the stored instructions further cause the processing unit to service the request for the data file and to provide service from the local cache when servicing the request requires data from the plurality of segments.

16. A method comprising:
receiving, by an access point, a first request for a data file;
requesting, by the access point, the data file from a content provider;
receiving, by the access point, a first segment of the data file from the content provider;
caching, by the access point, the first segment of the data file in a local cache;
receiving, by the access point, a request for a second segment of the data file, the second segment not being contiguous with the first segment, the first segment and the second segment correspond to time spots spread across the data file;
requesting, by the access point, the second segment of the data file from the content provider;
receiving, by the access point, the second segment of the data file from the content provider;
caching, by the access point, the second segment in the local cache, the first segment and the second segment comprising segments of the data file that a content provider has indicated as being more important than other segments in the data file;
receiving, by the access point, a second request for the data file; and servicing, by the access point, the second request for the data file, wherein servicing the second request comprises providing service from the local cache when servicing the second request requires data from the first segment and the second segment, wherein servicing the second request further comprises providing at least two indicators to indicate a time spot and duration for each of the first segment and the second segment wherein providing the at least two indicators comprises providing a first indicator to indicate a first time spot and duration for the first segment and providing a second indicator to indicate a second time spot and duration for the second segment of the data file cached in response to a second user snacking the data file, wherein displaying at least two indicators further comprises displaying a third indicator to indicate a third time spot and a third duration for a third segment of the data file caches in response to a video producer identifying a special segment in the data file, and wherein the first segment, the second segment, and the third segment are discontinuous segments of the data file.

17. The method of claim 16, wherein servicing, by the access point, the second request comprises providing service from the content provider when servicing the second request does not requires data from the first segment and second segment.

18. The method of claim 16, wherein receiving the first request for the data file comprises receiving the first request for the data file comprising video data.

19. The method of claim 16, wherein caching, by the access point, the first segment of the data file in the local cache further comprises saving a start time of the first segment in the data file.

20. The method of claim 16, further comprising removing, after a predetermined period of time, one of the following from the local cache: the first segment and the second segment.

21. An apparatus comprising:
a memory storage storing instructions; and
a processing unit coupled to the memory storage, wherein the stored instructions when executed, cause the processing unit to:
send a request for a data file;
receive data indicating that a plurality of segments of the data file has been previously cached in a local cache in the memory storage, the plurality of segments corresponding to discontinuous portions at time spots spread across the data file;
display at least two indicators configured to indicate that the plurality of segments of the data file is cached in the local cache, each of the at least two indicators being configured to indicate a time and location in the data file corresponding to each of the plurality of segments, wherein the processing unit being configured to display the at least two indicators comprises the processing unit configured to:
display a first indicator to indicate a first time spot and a first duration for a first segment of the data file cached in response to a first user snacking the data file,
display a second indicator to indicate a second time spot and a second duration for a second segment of the data file cached in response to a second user snacking the data file, and
display a third indicator to indicate a third time spot and a third duration for a third segment of the data file caches in response to a video producer identifying a special segment in the data file, and wherein the first segment, the second segment, and the third segment are discontinuous segments of the data file; and display, in response to a mouse hover over the indicator, a text string indicating that each of the plurality of segments of the data file are cached in the local cache.

22. The apparatus of claim 21, wherein the data file comprising video data.

23. The apparatus of claim 21, wherein, when executed the stored instructions further cause the processing unit to cache the plurality of segments of the data file in the local cache in response to a first user requesting the data file.

24. The apparatus of claim 21, wherein, when executed the stored instructions further cause the processing unit to cache the plurality of segments of the data file in the local cache in response to a content provider indicating the segment.

25. The apparatus of claim 21, wherein, when executed the stored instructions further cause the processing unit to cache the plurality of segments of the data file in the local cache in response to a content provider indicating that the segment is the most important segment in the data file.

26. The apparatus of claim 21, wherein, when executed the stored instructions further cause the processing unit to:

receive a selection of the indicator; and play, in response to the received selection, a segment of the data file.

* * * * *